United States Patent [19]

Jeanson

[11] 4,204,411
[45] May 27, 1980

[54] HOMOKINETIC TRANSMISSION
[75] Inventor: René H. Jeanson, Auzay, France
[73] Assignee: Societe Anonyme Francaise du Ferodo, Paris, France
[21] Appl. No.: 915,885
[22] Filed: Jun. 15, 1978
[30] Foreign Application Priority Data Jun. 23, 1977 [FR] France .................................. 77 19278

[51] Int. Cl.² .......................... F16C 1/02; B60D 1/00
[52] U.S. Cl. ....................................... 64/2 P; 64/2 R; 180/14 R
[58] Field of Search .............. 64/2 P, 2 R; 180/14 R, 180/14 D, 53 R, 53 D

[56] References Cited

U.S. PATENT DOCUMENTS

| | | | |
|---|---|---|---|
| 2,030,511 | 2/1936 | Gruber | 64/2 P |
| 2,427,824 | 9/1947 | Vutz | 180/14 R |
| 3,283,840 | 10/1966 | Lane | 180/14 R |
| 3,311,185 | 3/1967 | Duncan | 180/14 R |
| 3,557,892 | 1/1971 | Burrough | 180/14 D |
| 3,845,832 | 11/1974 | Glover | 180/14 R |
| 4,121,436 | 10/1978 | Garrison | 64/2 R |

Primary Examiner—Charles J. Myhre
Assistant Examiner—R. C. Turner
Attorney, Agent, or Firm—Young & Thompson

[57] ABSTRACT

The invention provides a substantially homokinetic transmission for rotationally connecting two shafts one of which is mounted on a fixed support and the other of which is mounted on a movable support so that its inclination is variable, and comprises two pairs of universal joints each interconnected by a connector of variable length, one pair attached to one of the shafts and the other attached to the other of the shafts; an intermediate shaft of fixed length is interposed between the two pairs of universal joints and this is carried by a third support pivotally mounted on the fixed support, and control means are provided for controlling the inclination of the intermediate shaft in relation to the position of the shaft which has a variable inclination.

8 Claims, 5 Drawing Figures

HOMOKINETIC TRANSMISSION

BACKGROUND OF THE INVENTION

The present invention relates to a transmission which is either strictly or approximately homokinetic, both cases being referred to as "substantially homokinetic" in the present description.

In most applications substantially homokinetic transmissions are provided between two shafts which are not coaxial but both of which have predetermined fixed positions in space.

This is so particularly in the case of two shafts which are parallel but offset relative to one another, or in the case of two converging shafts. In both cases the homokinetic condition may be fulfilled without particular difficulty by means of a pair of universal joints.

On the other hand, when one of the shafts, for example the driven shaft, has an inclination which is not fixed but which is variable in relation to the other shaft, for example the driving shaft, it has not hitherto been found possible to obtain between the two shafts, under good conditions, transmission which remains substantially homokinetic, particularly with a large variation in the angle of inclination.

There are various applications in which two shafts, of which one drives the other, have a variable inclination in relation to one another and where it is desirable to obtain substantially homokinetic conditions in the drive, whatever the inclination within predetermined limits. This is the case, for example, in a dredger which comprises a floating hull and a boom whose inclination in relation to the floating hull is variable and where it is desired to drive a submerged rotatable pump disposed at the end of the boom with the aid of a motor disposed on the hull.

It is important that the rotation of a shaft of any kind should be as regular as possible in order to avoid torsional vibration phenomena, wear, and possibly impairment of the operation of the driven components.

The present invention relates to a substantially homokinetic transmission between two shafts, of which one has a fixed position and the other a variable inclination in relation to the first, which transmission is of simple construction, strong, and efficient.

SUMMARY

According to the invention, a substantially homokinetic transmission between a first shaft carried by a first support whose position is fixed and a second shaft having a variable inclination in relation to the first and which is carried by a second support whose position is variable—one of these shafts being the driving shaft and the other the driven shaft—is characterised in that it comprises a first pair of universal joints associated with the first shaft, these universal joints of the first pair being connected by a rotationally fixed connection of variable length, a second pair of universal joints associated with the second shaft, the universal joints of this second pair being connected by a second rotationally fixed connection of variable length, and an intermediate shaft of fixed length interposed between the two pairs of universal joints, the said intermediate shaft being carried by a third support which is mounted for pivoting about a pin carried by the first support, while means are provided for controlling the position of the intermediate shaft at any moment in dependence on that of the second shaft of variable inclination. More particularly, the pivoting axis of the third support carrying the intermediate shaft is disposed substantially equidistantly between the two universal joints of the first pair of universal joints when all the shafts are in the aligned position.

This arrangement makes it possible for the transmission between the first shaft and the intermediate shaft to be made homokinetic. Obviously the homokinetic condition between the intermediate shaft and the second shaft should also be respected. This second condition can be respected either strictly or approximately, depending on the requirements of layout and operation.

In one embodiment in which the homokinetic condition is strictly complied with between the intermediate shaft and the second shaft, the second support is mounted for pivoting about an axis which is situated on the line of alignment of the three shafts, equidistantly from the end universal joints of the two pairs of universal joints when the three shafts are in alignment, while the connection means between the second support and the third support comprise cam means, for example in the form of a sliding member articulated to the second support and engaged in a slide guide of the third support, the axis of the sliding member being diametrically opposite the pivoting axis of the third support in relation to the pivoting axis of the second support when all the shafts are aligned.

In a modified embodiment the homokinetic condition is approximate and the second support is mounted for pivoting about an axis which is now not provided on the line of alignment of the three shafts but which is offset in relation to this line, while connecting means between the second support and the third support then consist of a simple connecting rod.

In all cases the particularly convenient and effective construction of the transmission according to the invention will be appreciated.

DESCRIPTION OF THE PREFERRED EMBODIMENTS

Figure 1:
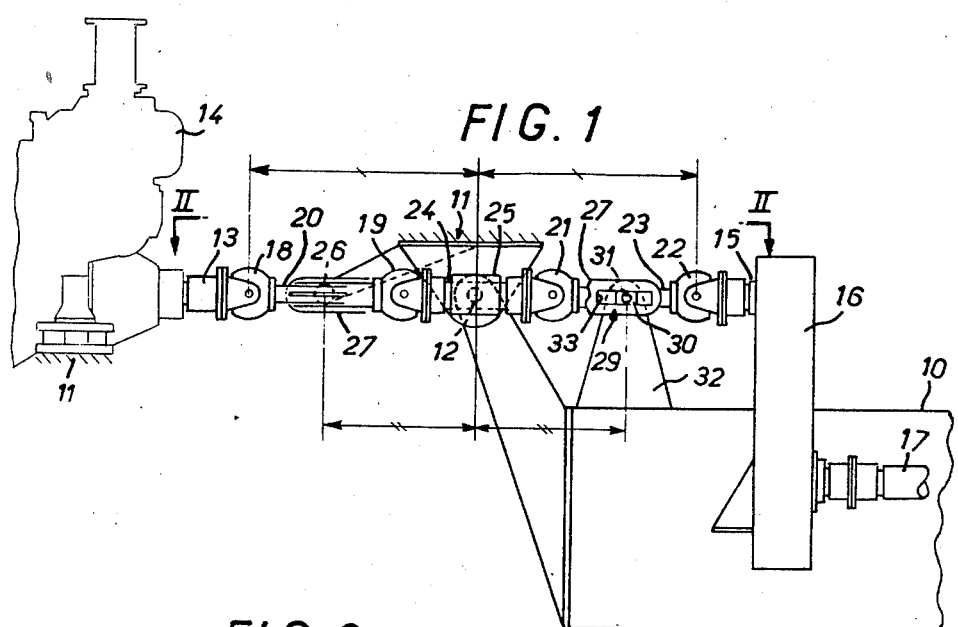
FIG. 1 is a diagrammatical view of a substantially homokinetic transmission according to the invention fitted to a dredger, in which the three shafts are in a position of alignment.
Figure 2:
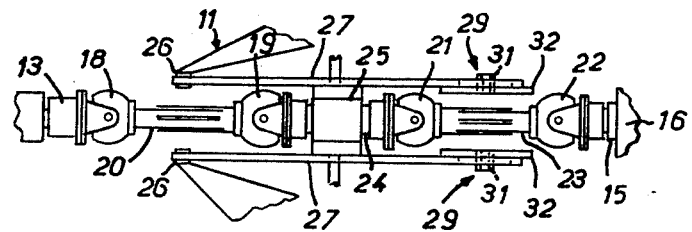
FIG. 2 is a corresponding view in the direction of the arrows II—II in FIG. 1.
Figure 3:
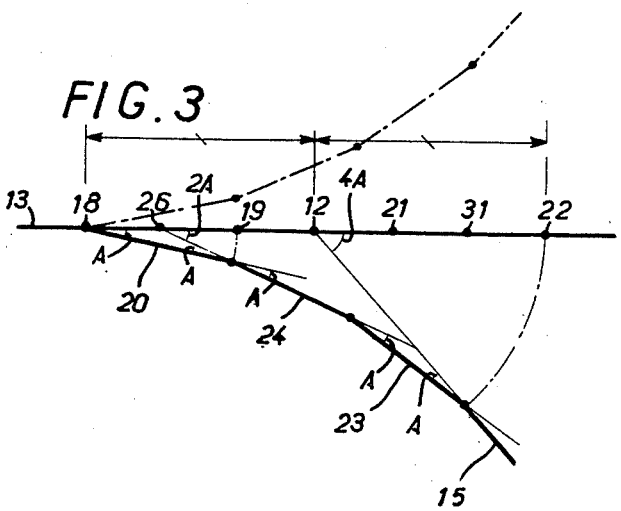
FIG. 3 is a diagram of the transmission shown in FIGS. 1 and 2, in which the second shaft is shown inclined.

Reference will first be made to FIGS. 1 to 3 which by way of non-limitative example relate to the application of the invention to a dredger having a boom 10 mounted on a floating hull 11 of the dredger, which can be inclined about a horizontal pin 12 fastened to the hull 11.

A substantially homokinetic transmission according to the invention, which in the example shown in FIGS. 1 to 3 is strictly homokinetic, is interposed between on the one hand a driving shaft 13 connected to the output of a motor 14 carried by the floating hull 11 and, on the other hand, a driven shaft 15 carried by the boom 10 and connected through reduction gearing 16 to a pump drive shaft 17.

The driving shaft 13 constitutes a first shaft carried by a first support 11 which has a fixed position, while the driven shaft 15 constitutes a second shaft having a variable inclination in relation to the first shaft 13 and being carried by the boom 10, which constitutes a second support whose position is variable.

The transmission comprises a first pair of universal joints 18 and 19 associated with the first shaft 13. The universal joints 18 and 19 are connected by a first connection 20 which is rotationally fixed and of variable length. This connection 20 may be composed of two shafts slidably engaged one over the other.

The transmission also comprises a second pair of universal joints 21 and 22 associated with the second shaft 15. The universal joints 21 and 22 are connected by a second connection 23 which is rotationally fixed and of variable length. Like the connection 20, this second connection 23 may be composed of two shafts slidably engaged one over the other.

The transmission also comprises an intermediate shaft 24 of fixed length which is interposed between the universal joints 19 and 21. The intermediate shaft 24 is carried by a third support 25 which is mounted for pivoting about a pin 26 carried by the floating hull 11. For this purpose the third support 25 comprises two side plates 27 which are disposed one on each side of the assembly 13, 18, 20, 24, 21, 23, 22, and 15.

The pivot pin 26 of the third support 25 is disposed (FIG. 3) equidistantly from the axis of the universal joints 18 and 19 when the three shafts 13, 24, and 15 are in alignment, so that the axis of the universal joint 19 can describe during the movement an arc of a circle having as its centre the pin 26 and passing through the axis of the universal joint 18.

Coupling means are provided between the second support comprising the boom 10 and the third support 25, in such a manner that the position of the intermediate shaft 24 at any moment will be dependent on the position of the second variable inclination shaft 15.

In the example shown in FIGS. 1 to 3, where the homokinetic condition is strictly fulfilled, the coupling means between the second support or boom 10 and the third support 25 comprise a cam means 29. This cam means 29 comprises for example a sliding member 30 which is mounted for rotation on a pin 31 fastened to legs 32 carried by the boom 10. The sliding member 30 is engaged in a slide guide 33 which is provided in each of the plates 27.

The pivot pin 12 of the boom 10 is disposed on the line of alignment of the three shafts 13, 24, and 15 and is disposed equidistantly from the end universal joints 18 and 22 when the three shafts 13, 24, and 15 are in alignment.

The pin 31 of the sliding member 30 is diametrically opposite the pin 26 in relation to the pin 12 when the three shafts 13, 24, and 15 are in alignment, so that the pin 31 of the sliding member 30 can describe during the movement an arc of a circle having the pin 12 as its centre and passing through the pin 26.

The construction which has just been described makes it possible for a condition of strictly homokinetic transmission to be fulfilled at any moment, as can be seen from the equality of the angles A in FIG. 3.

It will be observed that the angular movement between the first shaft 13 and the second shaft 15 is four times the angle A of movement of the universal joint 18. Furthermore, the transmission can move on each side of a position of alignment of the three shafts 13, 24, and 15.

Figure 4:
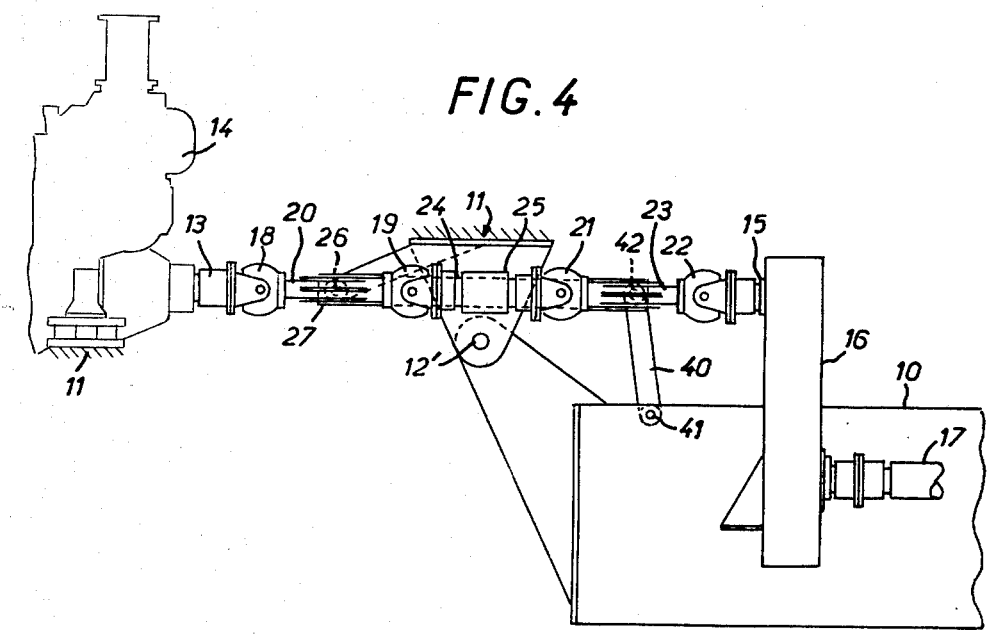
FIG. 4 is a similar view to FIG. 1, but relates to a modified embodiment in which the homokinetic condition is fulfilled not strictly but only approximately.
Figure 5:
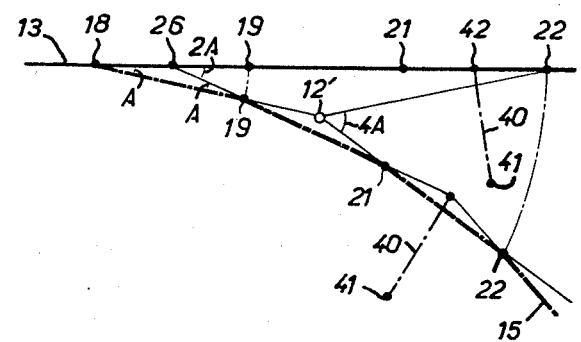
FIG. 5 is a diagram similar to that in FIG. 3, but relates to the transmission shown in FIG. 4.

Reference will now be made to FIGS. 4 and 5 in which the arrangement is similar to that described in connection with FIGS. 1 to 3, but in which the homokinetic condition is not now fulfilled strictly but only approximately beyond the strictly homokinetic position shown in heavy chain-dotted lines in FIG. 5.

In this case the coupling means between the second support or boom 10 and the third support 25 does not comprise a sliding member and slide arrangement but is a simple link 40 articulated at one end 41 to the boom 10 and at the other end 42 to the plates 27 of the third support 25. It is then desirable for the pivot pin 12' of the boom 10 not to be disposed on the line of alignment of the three shafts 13, 24, and 15, but to be offset in relation to that line, as shown in FIGS. 4 and 5.

The arrangement described in connection with FIGS. 4 and 5 makes it possible for the transmission to be of simple construction while achieving a substantially homokinetic condition.

I claim:

1. A substantially homokinetic transmission for location between a first shaft carried by a first support whose position is fixed, and a second shaft having a variable inclination in relation to the first and which is carried by a second support whose position is variable, one of these shafts being the driving shaft and the other the driven shaft, the transmission comprising a first pair of universal joints associated with the first shaft, which universal joints are connected by a rotationally fixed connection of variable length, a second pair of universal joints associated with the second shaft, which universal joints are connected by a second rotationally fixed connection of variable length, and an intermediate shaft of fixed length interposed between the two pairs of universal joints, the said intermediate shaft being carried by a third support which is mounted for pivoting about an axis carried by the first support, and control means for controlling the position of the intermediate shaft at any given time in relation to the position of said second shaft of variable inclination.

2. A transmission according to claim 1, wherein said control means comprises coupling means disposed between the second support and the third support.

3. A transmission according to claim 1, wherein said pivotal axis of the third support carrying the intermediate shaft is located substantially equidistantly between the axes of the two universal joints of the first pair when all the shafts are in the aligned position.

4. A transmission according to claim 1, wherein said second support is mounted for pivoting about an axis which is situated on the line of alignment of the three shafts and is equidistant from the outermost universal joints of the two pairs when the three shafts are in alignment.

5. A transmission according to claim 2, wherein said coupling means between the second support and the third support comprises cam means.

6. A transmission according to claim 5, wherein said cam means comprise a sliding member articulated to the second support by means of a pin and engaged in a slide guide of the second support, the sliding member being disposed diametrically opposite the pivotal axis of the third support in respect to the pivot pin of the second support when all the shafts are in alignment.

7. A transmission according to claim 1, wherein said second support is mounted for pivoting about an axis which is offset in relation to the line of alignment of the three shafts.

8. A transmission according to claim 7, wherein said coupling means between the second support and the third support consist of a link.

* * * * *